(12) United States Patent
Yamaguchi et al.

(10) Patent No.: US 8,753,775 B2
(45) Date of Patent: Jun. 17, 2014

(54) RECHARGEABLE LITHIUM BATTERY WITH AN ELECTRODE ACTIVE MATERIAL INCLUDING A MULTI-PHASE ALLOY POWDER

(75) Inventors: Takitaro Yamaguchi, Yokohama (JP); Ryuichi Shimizu, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/350,339

(22) Filed: Jan. 13, 2012

(65) Prior Publication Data

US 2012/0115044 A1 May 10, 2012

Related U.S. Application Data

(62) Division of application No. 11/177,919, filed on Jul. 7, 2005, now abandoned.

(30) Foreign Application Priority Data

Jul. 9, 2004 (JP) .................................. 2004-203292
Dec. 27, 2004 (JP) .................................. 2004-378253
Jun. 30, 2005 (KR) ......................... 10-2005-0057680

(51) Int. Cl.
*H01M 4/38* (2006.01)
*H01M 10/052* (2010.01)
*H01M 4/02* (2006.01)
*H01M 4/134* (2010.01)
*H01M 4/36* (2006.01)
*H01M 10/0567* (2010.01)
*H01M 10/0568* (2010.01)

(52) U.S. Cl.
CPC .............. *H01M 4/134* (2013.01); *H01M 4/364* (2013.01); *H01M 4/38* (2013.01); *H01M 4/386* (2013.01); *H01M 10/052* (2013.01); *H01M 10/0567* (2013.01); *H01M 10/0568* (2013.01)

USPC ......................................... 429/218.2; 429/341

(58) Field of Classification Search
CPC ..... H01M 4/133; H01M 4/134; H01M 4/364; H01M 4/386; H01M 10/052; H01M 10/0567; H01M 10/0568
USPC ................................................. 429/218.1, 341
See application file for complete search history.

(56) References Cited

U.S. PATENT DOCUMENTS 5,344,726 A    9/1994  Tanaka et al.
5,885,733 A *  3/1999  Ohsawa et al. ............... 429/309

(Continued)

FOREIGN PATENT DOCUMENTS

EP    0 581 296 A2    2/1994
JP    5-286763         11/1993

(Continued)

OTHER PUBLICATIONS

Machine translation for Iijima et al., JP 2004-362895 A.*

(Continued)

*Primary Examiner* — Edu E Enin-Okut
(74) *Attorney, Agent, or Firm* — Christie, Parker & Hale, LLP

(57) ABSTRACT

The present invention provides a lithium secondary battery having high-capacity as well as good cycle characteristics. The lithium secondary battery includes a positive electrode comprising a positive active material, a negative electrode comprising a negative active material and an electrolyte. The negative active material includes graphite particles combined to Si particulate. The electrolyte includes a solvent, a polyether modified silicone oil where a linear polyether chain is linked to a polysiloxane chain, and a solute comprising a lithium salt.

5 Claims, 10 Drawing Sheets

(56) References Cited

U.S. PATENT DOCUMENTS

| | | |
|---|---|---|
| 5,888,430 A | 3/1999 | Wakayama et al. |
| 6,124,062 A | 9/2000 | Horie et al. |
| 6,210,835 B1 | 4/2001 | Arai |
| 6,436,577 B1 | 8/2002 | Kida et al. |
| 6,541,156 B1 | 4/2003 | Fuse et al. |
| 6,733,922 B2 | 5/2004 | Matsubara et al. |
| 6,783,897 B2 | 8/2004 | Kang et al. |
| 6,787,189 B2 | 9/2004 | Konno et al. |
| 6,872,493 B2 | 3/2005 | Yamada et al. |
| 6,887,619 B2 | 5/2005 | West et al. |
| 7,351,501 B2 | 4/2008 | Jung et al. |
| 7,510,803 B2 | 3/2009 | Adachi et al. |
| 7,618,678 B2 | 11/2009 | Mao et al. |
| 8,092,940 B2 | 1/2012 | Tabuchi et al. |
| 2002/0028388 A1 | 3/2002 | Lee |
| 2002/0160256 A1 | 10/2002 | Kami et al. |
| 2003/0124432 A1 | 7/2003 | Miura et al. |
| 2003/0175589 A1* | 9/2003 | Kaminaka et al. ......... 429/218.1 |
| 2003/0190530 A1 | 10/2003 | Yang et al. |
| 2004/0197668 A1 | 10/2004 | Jung et al. |
| 2005/0170254 A1 | 8/2005 | West et al. |
| 2006/0166098 A1 | 7/2006 | Tabuchi et al. |

FOREIGN PATENT DOCUMENTS

| | | | |
|---|---|---|---|
| JP | 06-096759 | 4/1994 | |
| JP | 08-078053 | 3/1996 | |
| JP | 11-213042 | 8/1999 | |
| JP | 2000-58123 | 2/2000 | |
| JP | 2001-110455 | 4/2001 | |
| JP | 2001-118578 | 4/2001 | |
| JP | 2002110152 A * | 4/2002 | ............. H01M 4/38 |
| JP | 2002-255529 | 9/2002 | |
| JP | 2003-142157 A | 5/2003 | |
| JP | 2003-157896 | 5/2003 | |
| JP | 2003-171180 | 6/2003 | |
| JP | 2003-197030 | 7/2003 | |
| JP | 2003-229019 A | 8/2003 | |
| JP | 2003-297355 | 10/2003 | |
| JP | 2003-022367 | 1/2004 | |
| JP | 2004-22367 | 1/2004 | |
| JP | 2004-055505 | 2/2004 | |
| JP | 2004-095306 | 3/2004 | |
| JP | 2004362895 A * | 12/2004 | ............. H01M 4/38 |
| JP | 2005071655 A * | 3/2005 | ............. H01M 4/38 |
| KR | 2000-0076049 | 12/2000 | |
| WO | WO 03/019713 A1 | 3/2003 | |

OTHER PUBLICATIONS

Machine translation for Inagaki et al., JP 2002-110152 A.*
"Phase." Webster's Third New International Dictionary, n. d. Web. Feb. 14, 2013.*
Japanese Office action dated Apr. 17, 2012, for corresponding Japanese Patent application 2004-378253, (3 pages).
Patent Abstracts of Japan, and English machine translation of Japanese Publication 2001-118578 listed above, (18 pages).
U.S. Office action dated Jan. 17, 2006, for related U.S. Appl. No. 10/754,453.
U.S. Office action dated Jul. 14, 2006, for related U.S. Appl. No. 10/754,453.
U.S. Office action dated Jan. 10, 2007, for related U.S. Appl. No. 10/754,453.
U.S. Office action dated Jul. 18, 2007, for related U.S. Appl. No. 10/754,453.
Japanese Office action dated Apr. 5, 2011, for corresponding Japanese Patent application 2004-78253.

* cited by examiner

RECHARGEABLE LITHIUM BATTERY WITH AN ELECTRODE ACTIVE MATERIAL INCLUDING A MULTI-PHASE ALLOY POWDER

CROSS-REFERENCE TO RELATED APPLICATION

This application is a divisional of application Ser. No. 11/177,919 filed Jul. 7, 2005, which claims priorities to and the benefit of Japanese Application Nos. 2004-203292 and 2004-378253 filed with the Japanese Patent Office on Jul. 9, 2004 and Dec. 27, 2004, respectively, and Korean Patent Application No. 10-2005-0057680 filed with the Korean Intellectual Property Office on Jun. 30, 2005, the disclosures of which are incorporated fully herein by reference.

FIELD OF THE INVENTION

The present invention relates to a lithium secondary battery. More particularly, the present invention relates to a lithium secondary battery having high capacity and good cycle characteristics.

BACKGROUND OF THE INVENTION

As there is demand for a portable electronic device having a small size and light weight, as well as high performance characteristics, lithium secondary batteries having high capacity are needed.

Graphite for a negative active material of a lithium secondary battery has a theoretical electrical capacity of 372 mAh/g. In order to obtain a negative active material with higher capacity than graphite, it is necessary to develop an amorphous carbon material or a novel material that can replace a carbon material.

For example, Japanese Patent laid-open No. Hei 5-286763 discloses coating carbonaceous material and a metal being capable of alloying an alkali metal with a carbon material.

Recently, as disclosed in Japanese Patent laid-open No. 2002-255529, there has been active development for a composite material in which Si particulates are combined to graphite particles.

However, since Si particulate included in the composite material includes a functional group such as SiOH or Si=O on its surface, such functional groups contact the electrolyte and induce slow decomposition of the electrolyte resulting in significantly deteriorated cycle characteristics. Particularly, $LiPF_6$ as a conventional solute reacts with a hydroxyl group of SiOH to generate hydrofluoric acid (HF) easily. The HF deteriorates cycle characteristics remarkably.

SUMMARY OF THE INVENTION

An embodiment of the present invention provides a lithium secondary battery having high capacity as well as good cycle characteristics.

A lithium secondary battery according to one embodiment of the present invention includes a positive electrode including a positive active material, a negative electrode including a negative active material, and an electrolyte. The negative active material includes graphite particles combined to Si particulate. The electrolyte includes a solvent, a polyether modified silicone oil where a linear polyether chain is linked to a polysiloxane chain, and a solute including a lithium salt. The polyether modified silicone oil preferably includes a polyether chain linked to a position, except the terminal end, of a linear polysiloxane chain.

According to the above structure, a polyether modified silicone oil is added to an electrolyte. Since the polyether modified silicone oil is fused with a surface of Si particulate of a negative active material to form a protection layer, a decomposition reaction of the electrolyte with the Si particulate can be inhibited and thus cycle characteristics can be improved.

A lithium secondary battery according to another embodiment of the present invention includes a positive electrode including a positive active material, a negative electrode including a negative active material, and an electrolyte. The electrolyte includes a solvent, a polyether modified silicone oil where a linear polyether chain is linked to a polysiloxane chain, and a solute including a lithium salt. The negative active material includes a multi-phase alloy powder which includes Si-phase and SiM-phase, and also either one or both of X-phase or SiX-phase, and an amount of Si-phase on a surface of a multi-phase alloy powder particle is preferably less than that inside of the particle. The polyether modified silicone oil preferably includes a polyether chain linked to a linear polysiloxane chain, and more preferably includes a polyether chain linked to a position, except the terminal end, of a linear polysiloxane chain. Above, M is at least one element selected from the group consisting of Ni, Co, As, B, Cr, Cu, Fe, Mg, Mn, and Y, X is at least one element selected from the group consisting of Ag, Cu, and Au, and M and X are not simultaneously Cu.

According to the above structure, since the polyether modified silicone oil is fused with the Si-phase of a negative active material to form a protection layer, decomposition reaction of the electrolyte on Si-phase can be inhibited and thus cycle characteristics can be improved.

The polyether modified silicone oil is preferably added in an amount of about 0.2 wt % to about 20 wt %.

The lithium salt preferably includes at least one selected from the group consisting of $LiPF_6$, $Li(N(SO_2C_2F_6)_2)$, $Li(N(SO_2CF_3)_2)$, and $LiBF_4$, and the polyether modified silicone oil is preferably at least one selected from the group consisting of silicone oils of the following formulas 1 to 3.

Chemical formula 1

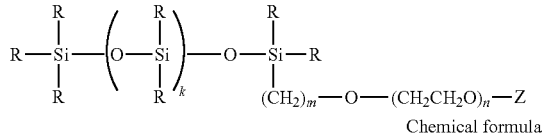

Chemical formula 2

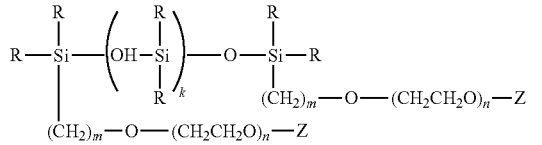

Chemical formula 3

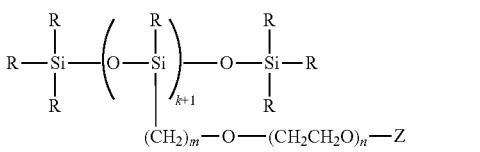

Wherein, in the above formulas 1 to 3, k ranges from 0 to 50, m ranges from 2 to 10, n ranges from 1 to 50, R is $CH_3$ or $C_6H_5$, and Z is $CH_3$ or $C_2H_5$.

In the present invention, the terminal end of the linear polysiloxane chain means R group.

In the lithium secondary battery according to the embodiment of the present invention, the lithium salt includes a mixture of $Li(N(SO_2CF_3)_2)$ and $LiPF_6$.

According to another embodiment of the present invention, a lithium secondary battery includes a positive electrode including a positive active material, a negative electrode including a negative active material where graphite particles and Si particulate are combined, and an electrolyte. The electrolyte includes a solvent and a lithium salt as a solute, and preferably includes 50 mol % or less $LiPF_6$ in the lithium salt.

Since an amount of $LiPF_6$ in the lithium salt is less than or equal to 50 mol %, HF generation reaction between $LiPF_6$ and Si particulate of the negative active material is inhibited and thus cycle characteristics of the lithium secondary battery can be improved.

The lithium salt preferably includes at least one selected from the group consisting of $Li(N(SO_2C_2F_5)_2)$, $Li(N(SO_2CF_3)_2)$, and $LiBF_4$.

The above electrolyte preferably includes at least one selected from the group consisting of $Li(N(SO_2C_2F_5)_2)$, $Li(N(SO_2CF_3)_2)$, and $LiBF_4$, as well as $LiPF_6$ as a solute. They can prevent reaction between the Si particulate and $LiPF_6$ and thus HF generation can be reduced to improve cycle characteristics.

The lithium salt preferably includes a mixture of $Li(SO_2CF_3)_2)$ and $LiPF_6$.

The above electrolyte includes $Li(N(SO_2CF_3)_2)$ as well as $LiPF_6$ as a solute and the $Li(N(SO_2CF_3)_2)$ can prevent reaction between the Si particulate and $LiPF_6$. Therefore, HF generation is reduced so improving cycle characteristics.

DETAILED DESCRIPTION OF THE INVENTION

Hereinafter, the first embodiment of the present invention will be described.

A lithium secondary battery of the present invention includes a positive electrode including a positive active material, a negative electrode including a negative active material which includes graphite particles combined to Si particulate, and an electrolyte. The electrolyte includes a solvent, a polyether modified silicone oil where a linear polyether chain is linked to a polysiloxane chain, and a solute including a lithium salt.

The polyether modified silicone oil preferably includes a polyether chain linked to a position, except the terminal end, of a linear polysiloxane chain.

The lithium salt preferably includes at least one selected from the group consisting of $LiPF_6$, $Li(N(SO_2C_2F_5)_2)$, $Li(N(SO_2CF_3)_2)$, and $LiBF_4$, and, more preferably a mixture of $Li(N(SO_2CF_3)_2)$ and $LiPF_6$.

The positive active material, the negative active material, and the electrolyte will be described in more detail.

A positive active material in the present embodiment includes a material being capable of intercalating and deintercalating lithium and, for example, at least one selected from the group consisting of complex oxides of lithium and at least one selected from the group consisting of cobalt, manganese, and nickel. Particularly, there are $LiMn_2O_4$, $LiCoO_2$, $LiNiO_2$, $LiFeO_2$, $V_2O_5$, and so on. A material being capable of intercalating and deintercalating lithium also includes TiS, MoS, organic sulfide compound, or organic polysulfide compound. The positive active material is mixed with a binder such as polyvinylidene fluoride and a conducting agent such as carbon black, and is shaped into a sheet, flat disk shape, and so on, to fabricate a positive electrode. A mixture including positive active material powder, binder, and conducting agent is shaped into a sheet, flat disk shape, and so on, and is laminated with a metal current collector to fabricate a positive electrode.

A negative active material includes a material where graphite particles are combined with Si particulate. As illustrated in FIGS. 1 to 4, carbonaceous material can be used where composite particles are arranged to be dispersed surrounding the graphite particles. The graphite particles and the composite particles are coated by an amorphous carbon membrane.

Figure 1:
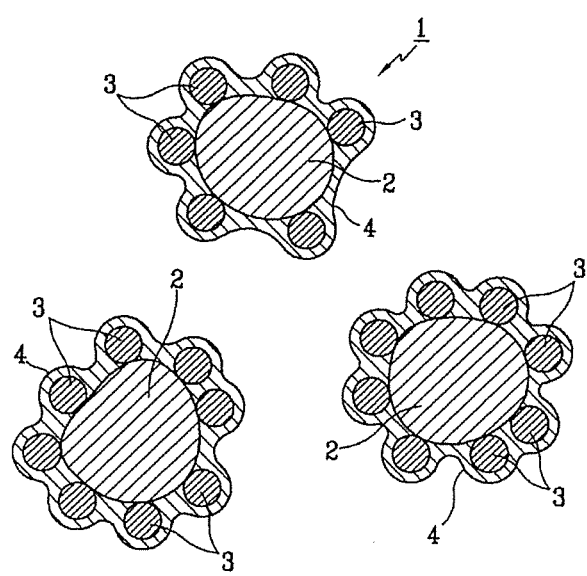
FIG. 1 is a schematic cross-sectional view showing one negative active material which constitutes a lithium secondary battery according to a first embodiment of the present invention.

In a carbonaceous material 1 of FIG. 1, a plurality of composite particles 3 are dispersed and adhered to a surface of a single graphite particle 2. An amorphous carbon membrane 4 coats the graphite particle 2 and the composite particles 3 in a smaller and more uniform thickness than the particle diameter of the composite particles 3. In a carbonaceous material 1 of FIG. 2, a plurality of composite particles 3 are dispersed and adhered to a surface of a plurality of graphite particles 2. An amorphous carbon membrane 4 coats the graphite particles 2 and the composite particles 3 in a larger and more uniform thickness than the particle diameter of the composite particles 3. The amorphous carbon membrane 4 covers the graphite particles 2 and the composite particles 3 and connects a plurality of graphite particles 2 to each other.

Figure 3:
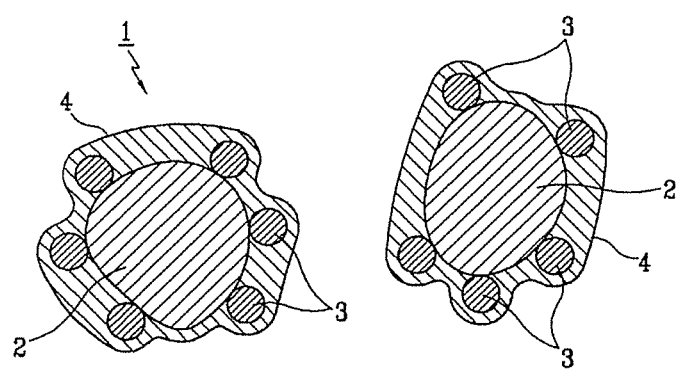
FIG. 3 is a schematic cross-sectional view showing another negative active material which constitutes the lithium secondary battery according to the first embodiment of the present invention.
Figure 4:
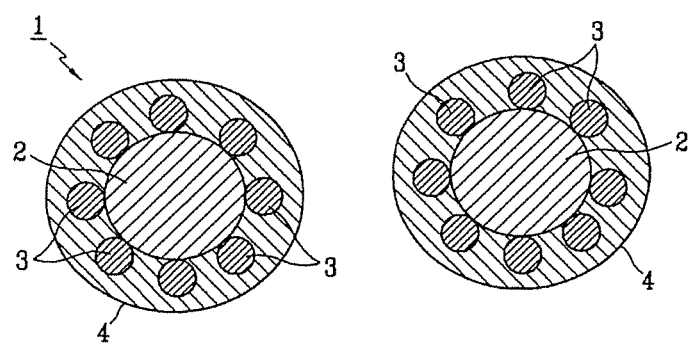
FIG. 4 is a schematic cross-sectional view showing another negative active material which constitutes the lithium secondary battery according to the first embodiment of the present invention.

In a carbonaceous material 1 of FIG. 3, a plurality of composite particles 3 are dispersed and adhered to a surface of a single graphite particle 2. An amorphous carbon membrane 4 coats the graphite particle 2 and the composite particles 3. In the carbonaceous material 1 of FIG. 4, a plurality of composite particles 3 are dispersed and adhered to a surface of a single graphite particle 2. An amorphous carbon membrane 4 coats the graphite particle 2 and the composite particles 3.

The graphite particles 2 included in the carbonaceous material preferably have an interplanar spacing (d002) ranging from 0.335 nm to 0.337 nm measured by X-ray wide-angle diffraction, more preferably ranging from 0.335 nm to 0.337 nm. The graphite particles 2 preferably have a particle diameter ranging 2 µm to 70 µm.

Figure 2:
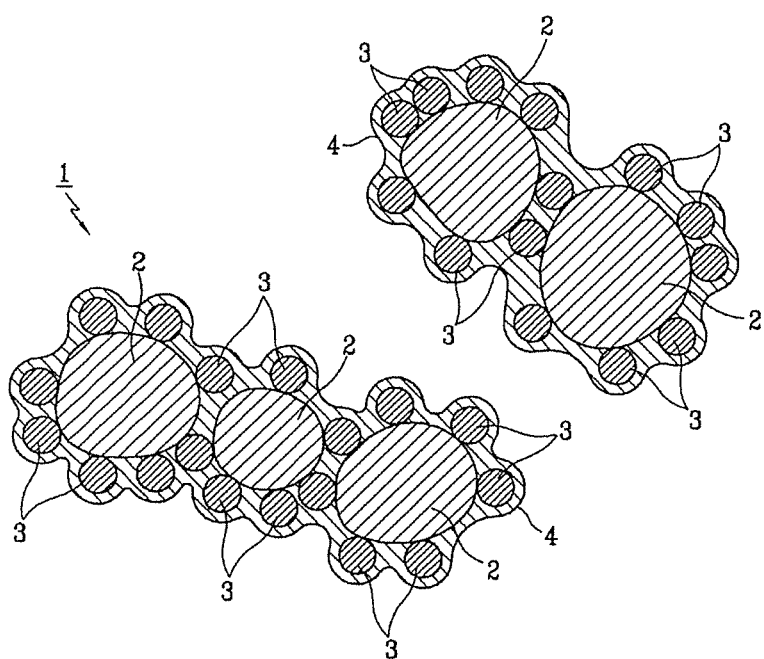
FIG. 2 is a schematic cross-sectional view showing another negative active material which constitutes the lithium secondary battery according to the first embodiment of the present invention.

The amorphous carbon membrane 4 as shown in FIGS. 1 to 4, coats the graphite particles 2 and the composite particles 3 as well as adhering the composite particles 3 to the surface of the graphite particles 2. The amorphous carbon membrane 4, as shown in FIG. 2, also connects the graphite particles 2 to each other. The amorphous carbon membrane 4 is obtained through heat treatment of at least one selected from the group consisting of thermoplastic resin, thermosetting resin, vinyl-based resin, cellulose-based resin, phenol-based resin, coal-based pitch material, petroleum-based pitch material, and tar-based material. It is relatively incompletely graphitizable and amorphous, and has interplanar spacing (d002) of more than or equal to 0.37 nm. Since the amorphous carbon membrane 4 is amorphous, there is no possibility of electrolyte decomposition even contacting the amorphous carbon membrane 4, and thus it can improve charge and discharge efficiency of the carbonaceous material 1.

The amorphous carbon membrane 4 preferably has a membrane thickness ranging from 50 nm to 5 µm.

The composite particles 3 are composed of Si particulate itself, or composite material of conductive carbon material coating Si particulate and Si particulate. The Si particulate is composed of crystalline silicon that has a particle diameter ranging 10 nm to 2 µm. Silicon is an element capable of alloying with lithium. If lithium ion works on Si particulate composed of silicon, lithium is invaded into pores on the surface of the Si particulate or inside of the Si particulate to form an alloy and thereby expands the Si particulate. If crystallinity of the Si particulate is reduced, alloy-forming performance with lithium is deteriorated and charge and discharge capacities are deteriorated. The conductive carbon material is arranged on a surface or a neighbourhood of the surface of the Si particulate. It is positioned on a surface of the Si semiconductor particulate to impart apparent conductivity to the Si particulate. The conductive carbon material includes, for example, carbon black, ketjen black, vapor grown carbon fiber (VGCF), and so on.

The negative active material including graphite particles combined with Si particulate can significantly improve charge and discharge capacities of a lithium secondary battery compared with a conventional negative active material including only graphite. Like the positive active material described above, the negative active material is mixed with a binder such as polyvinylidene fluoride and a conducting agent such as carbon black as needed, and is shaped into a sheet, flat disk shape, and so on, to fabricate a negative electrode. A mixture including a negative active material, binder, and conducting agent is shaped into a sheet, flat disk shape, and so on, and is laminated with a metal current collector to fabricate a negative electrode.

For the negative active material, carbonaceous material such as artificial graphite, natural graphite, graphitizable carbon fiber, graphitizable meso carbon microbead, amorphous carbon, and so on, can be used along with the carbonaceous material. A single metal substance capable of alloying with lithium or a composite material including the single metal substance and carbonaceous material can be used together as a negative active material. The metal lithium capable of alloying with lithium is exemplified by Al, Si, Sn, Pb, Zn, Bi, In, Mg, Ga, Cd, and so on.

A separator can be interposed between the positive and negative electrodes. The separator is essential in the case of non-gellitization of the electrolyte. A conventional separator such as porous polypropylene film, porous polyethylene film, and so on, can be used for the separator.

As described above, the electrolyte includes a solvent, a polyether modified silicone oil where a polyether chain is linked to a linear polysiloxane chain, and a solute except $LiPF_6$, as well as $LiPF_6$. The polyether modified silicone oil preferably includes a polyether chain linked to a position, except the terminal end, of a linear polysiloxane chain.

A gel electrolyte in which a polymer is impregnated can also be used. The polymer may include polyethyleneoxide (PEO), polypropyleneoxide (PPO), polyacrylonitrile (PAN), polyvinylidenefluoride (PVdF), polymethylacrylate (PMA), polymethylmethacrylate (PMMA), or a copolymer thereof.

The polyether modified silicone oil (hereinafter, also referred to as ⌈silicone oil⌋) in the electrolyte solution includes at least one represented by the above formulas 1 to 3. In the above formulas 1 to 3, k ranges from 0 to 50, m ranges from 2 to 10, n ranges from 1 to 50, R is $CH_3$ or $C_6H_5$, and Z is $CH_3$ or $C_2H_5$.

When k is more than 50, thermal stability is improved, but viscosity is excessively increased and ion conductivity is deteriorated due to decrease of salvation with lithium ions. When m is less than 2, it is difficult to synthesize the silicone oil. When m is more than 10, viscosity increases, and resultantly, ion conductivity is deteriorated.

When n is less than 1 (i.e., n is 0), there is no polyether chain linked to a polysiloxane chain, and compatibility with the solvent component of the electrolyte is deteriorated. When n is more than 50, the polyether chain length is longer and thus viscosity remarkably increases to thereby deteriorate ion conductivity. When R is $CH_3$ or $C_6H_5$, Z is $CH_3$, or $O_2H_5$, it is easy to synthesize silicone oil.

The silicone oil can be prepared by linking a polyether compound having double bond, such as $CH_2\!=\!CH$, to polysiloxane where partial R group is substituted with hydrogen, through hydrosilylation reaction.

Since such silicone oil includes silicon (Si) in its molecules, it is easy to fuse Si particulate composed of the negative active material. It can also form a protection layer by coating the surface of the Si particulate. Thereby, decomposition of the solute component on the surface of the Si particulate can be prevented.

Since the silicone oil includes a polysiloxane chain, it has high thermal stability and high ion conductivity because oxygen of ether linkage of the polyether chain is solvated with lithium ions. Since the polyether chain is linked to a linear polysiloxane chain, a whole structure of the silicone oil becomes linear, and thereby flexibility of the polyether chain is improved to reduce viscosity. Thereby, ion conductivity of the electrolyte can be improved. Viscosity of the silicone oil can be reduced and ion conductivity of the electrolyte can be improved by the linking polyether chain to the linear polysiloxane chain.

The solvent component included in the electrolyte includes, for example, a mixed solvent including cyclic carbonate and linear carbonate. The cyclic carbonate includes, for example, at least one selected from the group consisting of ethylene carbonate, butylene carbonate, propylene carbonate, and γ-butyrolactone. Since the cyclic carbonate is easy to be solvated with lithium ions, ion conductivity of non-aqueous electrolyte can be improved.

The linear carbonate, for example, includes at least one selected from the group consisting of dimethylcarbonate, methylethylcarbonate, and diethylcarbonate. Since the linear carbonate has low viscosity, it can reduce viscosity of the non-aqueous electrolyte and increase ion conductivity.

As the solute, lithium salt can be used. Particularly, it is preferable to include at least one selected from the group consisting of $LiPF_6$, $Li(N(SO_2C_2FO_2)$, $Li(N(SO_2CF_3)_2)$, and $LiBF_4$, and more preferably a mixture of $Li(N(SO_2CF_3)_2)$ and $LiPF_6$.

The lithium salt of the non-aqueous electrolyte is present in a concentration ranging from about 0.5 mol/L to 2.0 mol/L. The lithium salt improves ion conductivity of the non-aqueous electrolyte.

The silicone oil of the electrolyte may be added in an amount of 0.2 wt % to 20 wt %. When silicone oil is added in an amount of less than 0.2 wt %, solute decomposition can be prevented sufficiently. When it is added in an amount of more than 20 wt %, viscosity of the electrolyte is high and ion conductivity is deteriorated.

Since the electrolyte of the lithium secondary battery includes silicone oil and the silicone oil is fused with the surface of the Si particulate included in the negative active material, electrolyte decomposition on the Si particulate can be prevented to improve cycle characteristics.

Hereinafter, the lithium secondary battery according to the second embodiment of the present invention will be described. The lithium secondary battery according to the second embodiment includes a positive electrode including a positive active material, a negative electrode including a multi-phase alloy powder, and an electrolyte. The lithium secondary battery according to the second embodiment has the same structure as the lithium secondary battery according to the first embodiment, except that the negative active material is a multi-phase alloy powder. Hereinafter, a multi-phase alloy powder will be described in more detail but description of the electrolyte is omitted.

Figure 5:
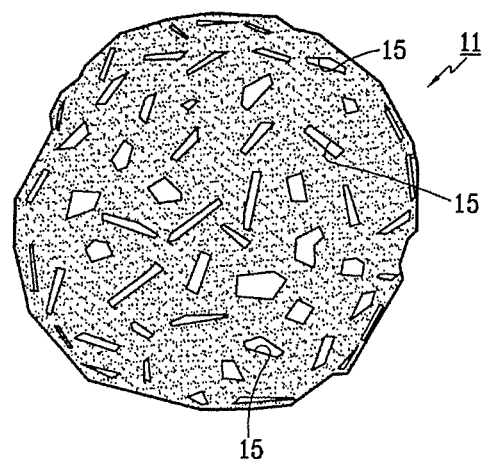
FIG. 5 is a schematic view showing another negative active material which constitutes a lithium secondary battery according to a second embodiment of the present invention.
Figure 6:
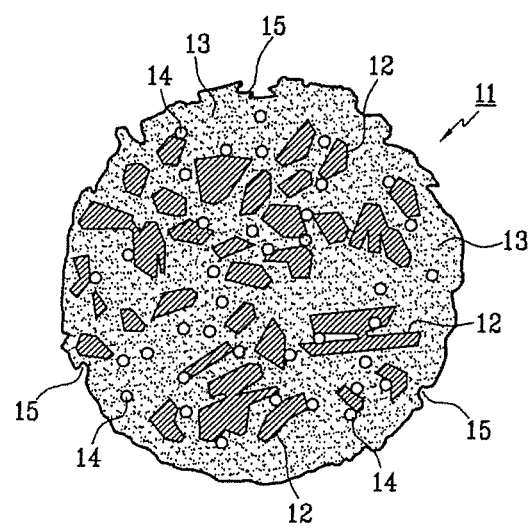
FIG. 6 is a schematic cross-sectional view showing another negative active material which constitutes the lithium secondary battery according to the second embodiment of the present invention.

The negative active material of the lithium secondary battery according to the second embodiment includes Si-phase and SiM-phase, and also either one or both of X-phase or SiX-phase, and an amount of Si-phase on a surface of the multi-phase alloy powder particle is preferably less than that inside of the particle. FIG. 5 is a schematic view showing an appearance of a particle which constitutes the multi-phase alloy powder. FIG. 6 is schematic cross-sectional view of the particle shown in FIG. 5.

As shown in FIGS. 5 and 6, the multi-phase alloy powder particle 11 of the negative active material includes Si-phase 12, SiM-phase 13, and X-phase and/or SiX-phase 14.

Si-phase 12 is present in a larger amount inside of the particle than on the surface of the particle. Si-phase 12 forms $LiSi_x$ phase by alloying lithium at charging and returns to Si single phase by deintercalating the lithium at discharging. Since Si-phase does not exist, or exists in only a little amount, on the surface of the particle, decomposition reaction of the electrolyte by the Si-phase can be prevented.

SiM-phase 13 does not react with lithium during charge and discharge, and maintains the shape of the particle 11 to prevent expansion and contraction of the particle 11 itself. The element M of SiM-phase 13 is a metal element which is not alloyed with lithium, and is at least one element selected from the group consisting of Ni, Co, As, B, Cr, Cu, Fe, Mg, Mn, and Y. Particularly, element M is preferably Ni, where SiM-phase becomes $Si_2Ni$ phase.

X-phase 14 imparts conductivity to a multi-phase alloy powder to reduce a specific resistance of the negative active material. Element X constituting X-phase 14 is a metal element having specific resistance of less than 3 Ω·m and is at least one selected from the group consisting of Ag, Cu, and Au. Particularly, since Cu does not react with lithium to form an alloy, it can prevent expansion. Since Ag is not alloyed with Si, Ag is present in a single phase to improve conductivity of the particle by selecting a metal which is not alloyed with Ag as the element M.

Since Cu is alloyed with Si and has lower resistance than Si, it has both properties of element M and element X. In the above embodiment, Cu can be used as an element M or an element X, but Cu is not selected for both element M and element X simultaneously.

SiX-phase can be deposited as well as or instead of X-phase 14. SiX-phase imparts conductivity to a multi-phase alloy powder like X-phase 14 to reduce a specific resistance of the negative active material.

Crystal properties of the Si-phase 12, SiM-phase 13, X-phase 14, and SiX-phase depend on a quenching rate, an alloy composition, and presence or absence of heat treatment after quenching. In the negative active material, each phase may be a crystalline or amorphous phase, or a mixed phase of crystalline phase and amorphous phase. The negative active material may include another alloy phase along with Si-phase, SiM-phase, X-phase, and SiX-phase.

Hereinafter, an alloy composition will be described. Si is an element forming a Si single phase and SiM-phase, and further SiX-phase, composition ratio is determined from an alloy phase diagram to form Si single phase, as well as SiM-phase and SiX-phase, and the capacity of Si can be obtained. When an amount of Si increases excessively, many Si-phases are deposited to increase expansion and contraction amount of the negative active material during charge and discharge, and the negative active material becomes a fine powder thereby deteriorating cycle characteristics. Specifically, the Si amount in the negative active material ranges from about 30 wt % to 70 wt %.

Since the element M is an element which can form SiM-phase with Si, its amount is determined from an alloy phase diagram so that the whole amount of M may alloy with Si. When the amount of M exceeds the amount capable of alloying with Si, the whole Si is alloyed decreasing capacity remarkably. When the amount of M is less than the amount capable of alloying with Si, SiM-phase is reduced, expansion prevention of Si-phase is reduced, and cycle characteristics are deteriorated. M-phase may be present as a plurality of different elements, that is, M1-phase, M2-phase, and M3-phase. Since a solid-solution limit with Si is different depending on the kind of element, the composition ratio of M can not be specifically limited. The composition ratio should be determined so that Si-phase may remain after Si and M are alloyed to their solid-solution limit. Since the element M is not alloyed with lithium, it does not have a non-reversible capacity. The element M is preferably insoluble in an alkali solution.

When a composition ratio of X increases, specific resistance is reduced, but Si-phase is significantly reduced to deteriorate charge and discharge capacity. On the contrary, when a composition ratio of X decreases, specific resistance of the negative active material increases to deteriorate charge and discharge efficiency. The composition ratio of X preferably ranges 1 wt % to 30 wt % in the negative active material. The element X is preferably insoluble in an alkali solution.

An average particle diameter of a multi-phase alloy powder preferably ranges from 5 μm to 30 μm. Generally Si-included alloy powder has higher resistance than graphite powder which has been used as a negative electrode material of a lithium secondary battery, and therefore it is preferable to use a conducting agent. When the average particle diameter is less than 5 μm, an average particle diameter of the multi-phase alloy powder is less than the particle diameter of the conducting agent and thus an adding effect of the conducting agent is not sufficient, and therefore battery characteristics, such as capacity or cycle characteristics, are deteriorated. When the average particle diameter is more than 30 μm, filing density of the negative active material in the lithium secondary battery is deteriorated.

As shown in FIGS. 5 and 6, a plurality of fine pores 15 are formed on a surface of a multi-phase alloy powder particle. The fine pores 15 are formed through impregnation with an alkali solution after quenching an alloy melt solution. It is a trace remained through an elution of Si-phase exposed on a surface of the particle immediately after quenching. Since the Si is not exposed on the surface of a particle, reaction with an electrolyte during charge is prevented and a specific surface area of a multi-phase alloy powder increases and so contact area with the electrolyte increases by formation of the fine pores 15 to improve charge and discharge efficiency.

The fine pores 15 have an average pore diameter ranging from about 10 nm to about 5 μm and depth of the fine pores 15 ranges from 10 nm to 1 μm The multi-phase alloy powder has a specific surface area ranging from 0.2 $m^2/g$ to 5 $m^2/g$.

In the lithium secondary battery including the negative active material, since an amount of Si-phase on a surface of the particle is preferably less than that inside of the particle, electrolyte decomposition reaction by Si-phase is inhibited to improve cycle characteristics.

Since silicone oil added in the electrolyte is fused with the surface of Si-phase of the negative active material, electrolyte decomposition reaction by Si-phase is inhibited to improve cycle characteristics.

Since SiM-phase and X-phase are included in a particle, as well as Si-phase, expansion and contraction of the particle can be reduced compared with that including only Si-phase, there are no problems that the negative active material becomes a fine powder and is detached from a current collector, and contact with a conductive material can be maintained to improve charge and discharge capacity and cycle characteristics.

Further, because of the plurality of fine pores on the surface of the multi-phase alloy powder particle, lithium ions can be diffused efficiently to enable high rate charge and discharge because non-aqueous electrolyte is impregnated in the fine pores and high conductive X-phase is present therein.

For example, the negative active material can be prepared as follows.

A method of preparing the negative active material includes obtaining quenched alloy powder which includes Si, element M, and element X, and impregnating the quenched alloy powder with an alkali solution. Hereinafter, each process step will be described.

First, the quenched alloy powder is obtained by quenching an alloy melt solution including Si, element M, and element X. The alloy melt solution is obtained by dissolving a single substance or an alloy simultaneously, for example, through high frequency induced heating method.

In the alloy melt solution, Si content ranges from about 30 wt % to about 70 wt %. When Si content is excessively small in the alloy melt solution, Si-phase is not deposited. On the contrary, when Si content is excessively large, a negative active material that is not easily expanded and contracted is obtained.

The alloy melt solution can be quenched, for example, using gas atomization, water atomization, roll quenching, and so on. Through gas atomization and water atomization, powder-phase quenched alloy is obtained and through roll quenching, thin bar-shaped quenched alloy is obtained. The bar-shaped quenched alloy is further pulverized to obtain a powder. An average particle diameter of such obtained quenched alloy powder is the average particle diameter of the resultant multi-phase alloy powder. When obtaining the quenched alloy powder, its average particle diameter is preferably adjusted to range from about 5 μl to 30 μm.

The quenched alloy powder obtained from an alloy melt solution can be a quenched alloy including entirely amorphous phase, or a quenched alloy including partial amorphous phase and the rest being crystalline phase particles, or a quenched alloy including entirely crystalline phase. The quenched alloy powder includes SiX-phase and SiM-phase, and also includes either one or both of X-phase and SiX-phase. Each Si-phase, SiM-phase, X-phase, and SiX-phase is present in a uniformly mixed state in an alloy structure.

A quenching rate ranges more than or equal to about 100K/second. When the quenching rate is less than 100K/second, there is a problem that each Si-phase, SiM-phase, X-phase, and SiX-phase is not deposited uniformly in an alloy structure, and crystal size of each phase increases and it is difficult to obtain uniform expansion prevention and conductivity impartment.

Next, the quenched alloy is impregnated in alkali solution and Si-phase deposited on the surface of the quenched alloy powder particle is eluted and removed. Specifically, quenched alloy powder is impregnated in alkali solution to wash and dry it. The impregnation is performed for 30 minutes to 5 hours while slowly agitating at room temperature. The alkali solution includes sodium hydroxide or potassium hydroxide aqueous solution, and its concentration ranges from 1N to 5N.

The above impregnation condition is exemplified, and the impregnation condition can actually be determined by confirming that only Si-phase deposited on the surface of the particle is eluted and removed. If the impregnation treatment is performed excessively, Si-phase inside of the particle as well as on the surface is eluted and removed to deteriorate charge and discharge capacities of the negative active material. If Si-phase inside of the particle is eluted and removed, strength of the particle is deteriorated. If the impregnation condition is insufficient, Si-phase remains on the surface of the particle to induce decomposition reaction of electrolyte.

Specifically, until the specific surface area of the powder after removing Si-phase is 1.2 times larger than that of the quenched alloy powder before removing Si-phase, it is preferable to perform impregnation treatment with an alkali solution. By performing the impregnation treatment until the specific surface area is 1.2 times larger than the initial size, partial or entire Si on the surface can be removed to inhibit a reaction with the electrolyte.

It also is performed until the specific surface area of the powder after removing Si-phase is 50 times smaller than that of the quenched alloy powder before removing Si-phase. Thereby, dissolving Si above necessity is prevented to inhibit reduction of battery capacity.

Through the impregnation treatment, Si-phase deposited on the surface of the quenched alloy powder particle is eluted and removed, and SiM-phase and X-phase and/or SiX-phase are present on the surface of the particle. Fine pores remain in positions where Si-phase is removed. By removing Si-phase on the surface of the particle, an amount of Si-phase on the surface of the particle is less than that inside of the particle.

Since the element M and the element X are insoluble in alkali solution and SiM-phase and SiX-phase are difficult to dissolve in an alkali solution, Si-phase is preferentially eluted.

The alloy melt solution including element M, element X, and Si is quenched to easily prepare quenched alloy powder including SiX-phase and SiM-phase, and also either one or both of X-phase and SiX-phase. The obtained quenched alloy powder is impregnated in an alkali solution to remove Si-phase on the surface of the particle, and thereby Si-phase amount on the surface of the particle renders to be smaller than that inside of the particle. Such obtained negative active material inhibits decomposition reaction of the electrolyte and reduces expansion and contraction of the particle itself to improve cycle characteristics.

Thereby, multi-phase alloy powder can be obtained easily which includes SiX-phase and SiM-phase, and also either one or both of X-phase and SiX-phase. Particularly, through gas atomization or water atomization, spherical powders can be obtained. Therefore, filing density and energy density of the negative active material can be improved.

Next, a lithium secondary battery according to the third embodiment of the present invention will be described. The lithium secondary battery according to the present embodiment includes a positive electrode including a positive active material, a negative electrode including a negative active material where graphite particle and Si particulate are combined, and an electrolyte. The electrolyte includes a solvent and a solute including a lithium salt. $LiPF_6$ content of the lithium salt ranges less than or equal to 50 mol %.

The positive active material and the negative active material are the same as those in the first embodiment. A separator may be arranged between the positive and negative electrodes as in the first embodiment.

Next, the electrolyte according to the third embodiment includes a solvent and a solute including a lithium salt. $LiPF_6$ content of the lithium salt ranges less than or equal to 50 mol %. By adjusting $LiPF_6$ content to be less than or equal to 50 mol %, HF generation reaction between $LiPF_6$ and Si particulate of the negative active material is prevented. As a result, cycle characteristics of the lithium secondary battery can be improved. $LiPF_6$ content is less than or equal to 50 mol %, and $LiPF_6$ content may be 0 mol %.

A lithium salt, except $LiPF_6$, includes at least one selected from the group consisting of $Li(N(SO_2C_2F_5)_2)$, $Li(N(SO_2CF_3)_2)$, and $LiBF_4$. If $LiPF_6$ is added, ion conductivity of the electrolyte is improved and thus charge and discharge capacities are improved, but $LiPF_6$ and Si particulate included in the negative active material are reacted to generate HF and the HF significantly deteriorates cycle characteristics. Therefore, by adding as a solute at least one selected from the group consisting of $Li(N(SO_2C_2F_5)_2)$, $Li(N(SO_2CF_3)_2)$, and $LiBF_4$ as a main component, an adding amount of $LiPF_6$ is relatively reduced, and thereby HF generation reaction between $LiPF_6$ and Si particulate of the negative active material can be inhibited thereby improving cycle characteristics of the lithium secondary battery. When an adding amount of $LiPF_6$ of the lithium salt is more than 50 mol %, a large amount of HF is generated deteriorating cycle characteristics. More preferably, $LiPF_6$ is added in an amount of less than or equal to 20 mol %.

As the lithium salt, a mixture of $Li(N(SO_2CF_3)_2)$ and $LiPF_6$ can be used. Mole ratio of $Li(N(SO_2CF_3)_2)$ and $LiPF_6$, for example, ranges from 50:50 to 95:5. When the mole ratio of $Li(N(SO_2CF_3)_2$ is reduced, HF generation reaction can not be inhibited. When the mole ratio of $LiPF_6$ is reduced, it dissolves aluminum of the positive current collector.

Concentration of the lithium salt in the electrolyte ranges from 0.5 mol/L to 2.0 mol/L.

As a solute of the electrolyte, since $LiPF_6$ is added in an amount of less than or equal to 50 mol %, reaction between Si particulate and $LiPF_6$ can be inhibited. Thereby, HF generation is reduced to improve cycle characteristics.

EXAMPLE

The present invention will be described by the following Experimental Examples 1 to 3 in further detail.

Experimental Example 1

Lithium secondary battery cells including electrolytes having various additive components and their compositions were fabricated, and their cycle characteristics were estimated.

Battery cells were prepared as follows. Positive electrode slurry was prepared first by mixing a $LiCoO_2$ positive active material having 10 μm average particle diameter, a binder of polyvinylidene fluoride, and a carbon powder conducting agent having 3 μm average particle diameter, and then by mixing with N-methyl-2-pyrrolidone. The positive electrode slurry was coated onto a current collector of 20 μm thick aluminum foil by doctor blade method, dried at 120° C. for 24 hours under vacuum atmosphere to volatilize N-methyl-2-pyrrolidone, and then pressed. An active mass including a positive active material was laminated with the current collector to fabricate a positive electrode.

Next, 2 parts by weight of Si particulate having 200 nm average particle diameter was mixed with 1 part by weight of carbon black. Further, most of the Si particulate structure is composed of crystalline silicon. A solution where 10 parts by weight of phenol resin was dissolved in isopropyl alcohol was prepared, and was mixed with a mixture of Si particulate and carbon black and then the solvent was removed after agitating sufficiently. In this way, a composite particle precursor where carbon black and phenol resin film were attached on a surface of the Si particulate was formed. Next, the composite particle precursor was heat-treated under argon atmosphere at 1000° C. for 180 minutes to carbonize the phenol resin film. As a result, a hard carbon membrane of 0.05 μm thickness was formed. Resultantly, a composite particle including Si particulate was obtained.

5 parts by weight of the composite particle was added to 95 parts by weight of natural graphite having 15 μm average particle diameter and then isopropyl alcohol was further added and mixed by wet process. Isopropyl alcohol solution including 10 parts by weight of phenol resin was added to the mixture and mixed, and the isopropyl alcohol was evaporated. Resultantly, carbonaceous material precursor where composite particle and phenol resin film were attached on the surface of the natural graphite was formed.

The carbonaceous material precursor was fired under vacuum atmosphere at 1000° C. (1273K) to carbonize the phenol resin and fabricate a 0.05 μM thick amorphous carbon membrane.

A negative active material where the graphite particles and Si particulate were combined was fabricated.

A negative electrode slurry was prepared by mixing the obtained negative active material and a binder of polyvinylidene fluoride, and then adding N-methyl-2-pyrrolidone. The negative electrode slurry was coated onto a current collector of Cu foil having 14 μl thickness by doctor blade method, and dried at 120° C. for 24 hours under vacuum atmosphere to volatilize N-methyl-2-pyrrolidone, and pressed.

An active mass including the negative active material was laminated with the current collector to fabricate a negative electrode.

Electrolytes of Examples 1 to 11 were prepared by adding solute and silicone oil described in the following Table 1 into a solvent of ethylenecarbonate (EC) and diethylcarbonate (DEC) mixed in a ratio of EC:DEC=30:70. The silicone oil 1 of the following Table 1 was a silicone oil having the above formula 1 where k=0, m=3, n=2, and R and Z=$CH_3$. Silicone oil 2 was a silicone oil having the above formula 1 where k=0, m=4, n=2, and R and Z=$CH_3$.

The positive electrode was cut in a disk shape of 14 mm diameter, and the negative electrode was cut in a disk shape of 16 mm diameter. A polypropylene porous separator was arranged between the fabricated positive electrode and negative electrode, and housed in a battery case. Then the electrolyte was injected, and the battery case closed and sealed to fabricate a coin-type lithium secondary battery cell having 20 mm diameter and 1.6 mm thickness.

The obtained lithium secondary battery cells were initially charged and discharged as follows: they were aged for 15 hours, were charged at 0.2 C to 4.2V under constant current, then were constant voltage charged under constant current and constant voltage at 4.2V for 9 hours, and then discharged under constant current at 0.2 C to 2.75V.

Figure 7:
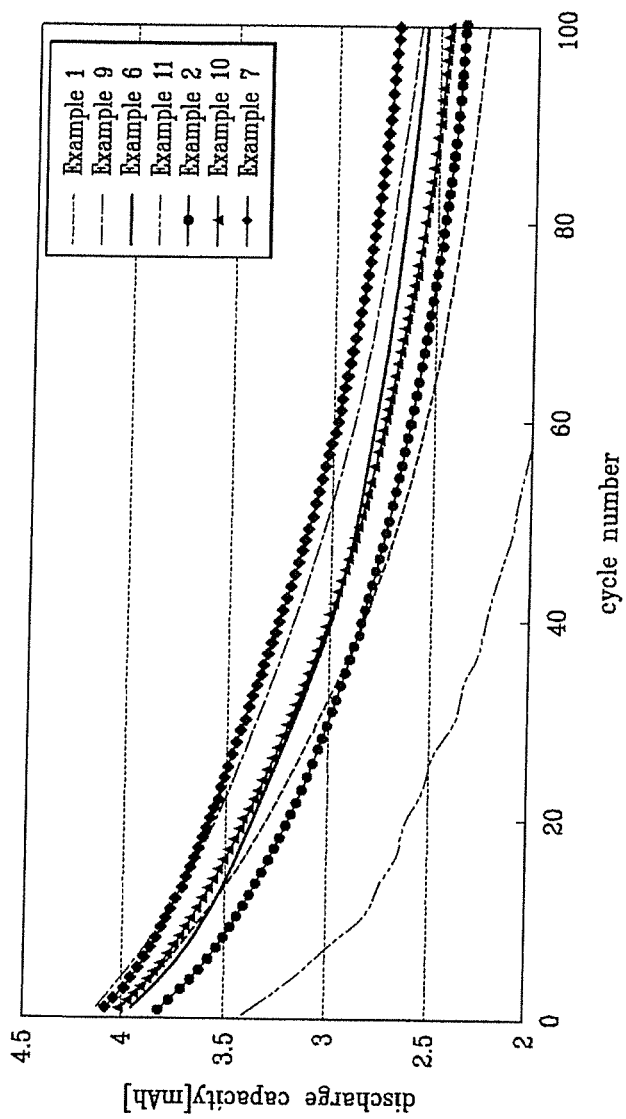
FIG. 7 is a graph showing a relation between a cycle number and discharge capacity of a lithium secondary battery in Examples 1, 2, 6, 7, 9, 10, and 11.
Figure 8:
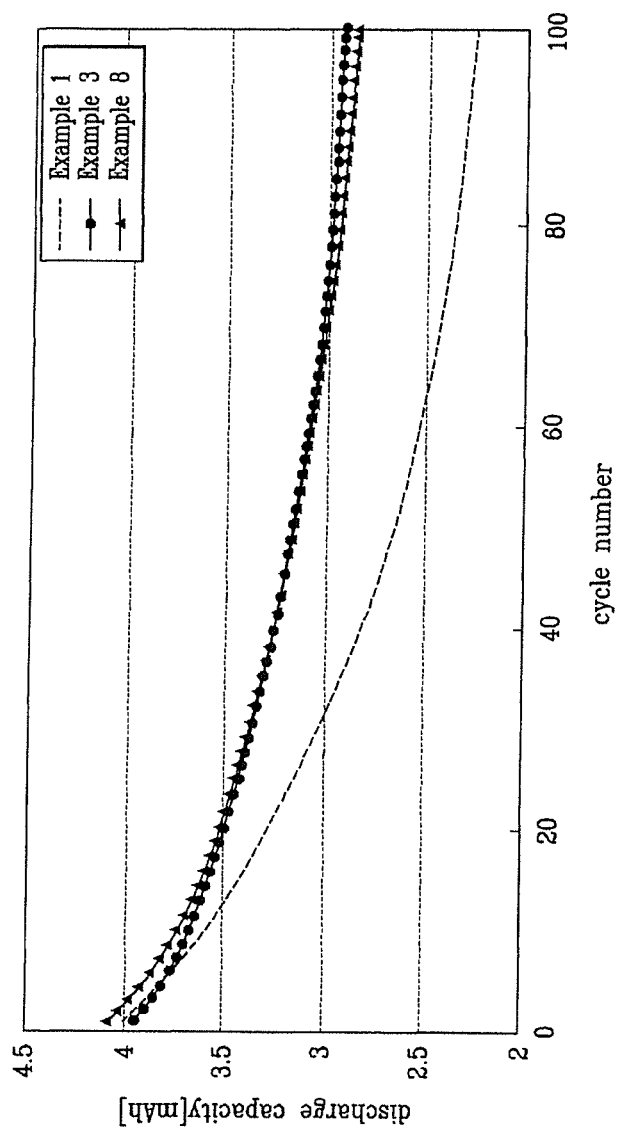
FIG. 8 is a graph showing a relation between a cycle number and discharge capacity of a lithium secondary battery in Examples 1, 3, and 8.

After initial charge and discharge, 1 cycle charge and discharge were performed as follows: the lithium secondary battery cells were charged under constant current at 1 C (0.8 mA) to 4.2 V and constant voltage charged under constant current constant voltage at 4.2V for 2.5 hours and discharged under constant current 1 C (0.8 mA) to 2.75V. The above charge and discharge cycle was performed to 100 cycles and capacity retentions after 100 cycles of the lithium secondary battery cells were measured. The results are shown in the following Table 1, and FIGS. 7 and 8.

In the following Table 1, LiTFSI denotes Li(N($SO_2CF_3$)$_2$) and LiBETI denotes Li(N($SO_2C_2F_5$)$_2$).

TABLE 1

| | Solute | Silicone oil | Capacity retention (%) |
|---|---|---|---|
| Example 1 | 1.3M $LiPF_6$ | — | 55.8 |
| Example 2 | 1.3M $LiPF_6$ | Silicone oil 1 (1 wt %) | 61.6 |
| Example 3 | 1.3M $LiPF_6$ | Silicone oil 2 (1 wt %) | 73.4 |
| Example 4 | 1.3M LiTFSI | — | — |
| Example 5 | 1.3M LiTFSI | Silicone oil 1 (1 wt %) | — |
| Example 6 | 1.3M LiTFSI + $LiPF_6$ (80:20) | — | 64.7 |
| Example 7 | 1.3M LiTFSI + $LiPF_6$ (80:20) | Silicone oil 1 (1 wt %) | 65.6 |
| Example 8 | 1.3M LiTFSI + $LiPF_6$ (80:20) | Silicone oil 2 (1 wt %) | 69.5 |
| Example 9 | 1.0M LiBETI | — | 62.4 |
| Example 10 | 1.0M LiBETI | Silicone oil 1 (1 wt %) | 60.7 |
| Example 11 | 1.5M $LiBF_4$ | — | 49.1 |

As shown in Table 1, Examples 2 and 3, including the silicone oils 1 and 2 respectively, both show improved cycle characteristics compared to Example 1 (Comparative Example) including only $LiPF_6$.

Example 6 where $LiPF_6$ and Li(N($SO_2CF_3$)$_2$) were added, even though silicone oil was not added, shows more improved cycle characteristics than Example 1. Cycle characteristics of Examples 7 and 8 where silicone oil was added to the electrolyte of Example 6 were more improved than that of Example 6.

Examples 4 and 5 where only Li(N($SO_2CF_3$)$_2$) was added as a solute, aluminum of a positive current collector was dissolved by Li(N($SO_2CF_3$)$_2$), resulting that charge and discharge were almost impossible.

As described above, cycle characteristics were improved significantly by adding Li(N($SO_2CF_3$)$_2$) as well as $LiPF_6$ to the electrolyte, or adding a silicone oil to the electrolyte.

Capacity retentions of Examples 9 and 10 were improved more than that of Example 1. This results from $LiPF_6$ not being included in Examples 9 and 10, and so HF was not generated and so did not deteriorate cycle characteristics.

Experimental Example 2

A positive electrode and a negative electrode were fabricated using the same method as in Experimental Example 1.

Electrolytes of Examples 12 to 14 were prepared by adding 1.3M $LiPF_6$ as a solute to a solvent of ethylenecarbonate (EC) and diethylcarbonate (DEC) mixed in a ratio of EC:DEC=30:70, and adding 5, 10, and 20 wt %, respectively, of silicone oil. The added silicone oil was the same as the silicone oil 2 of Experimental Example 1, where k=0, m=4, n=2, and R and Z=$CH_3$ in the above formula 1.

Figure 9:
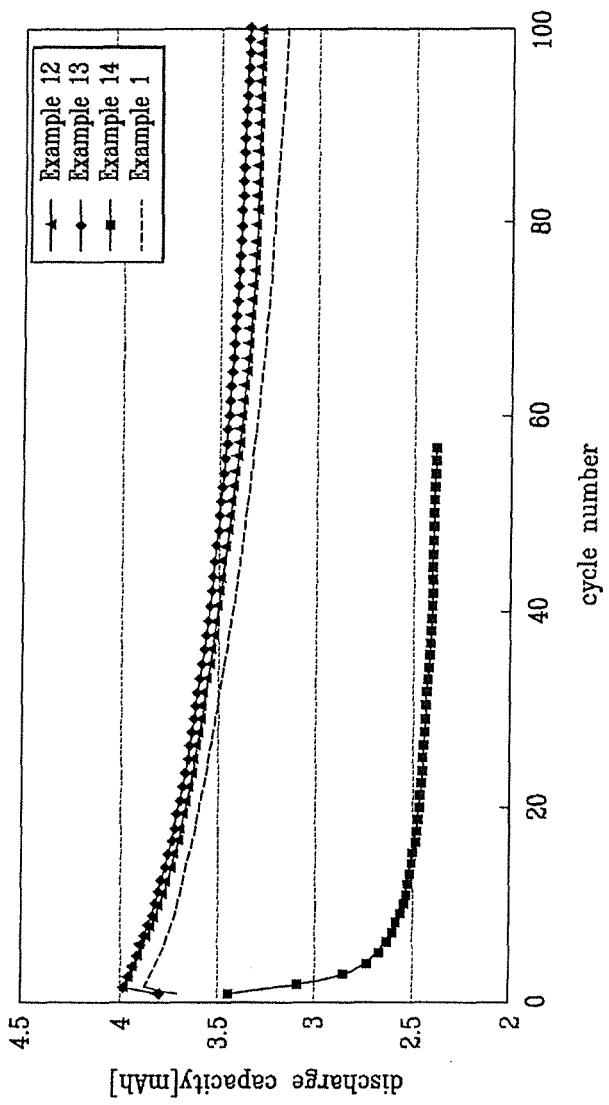
FIG. 9 is a graph showing a relation between a cycle number and discharge capacity of a lithium secondary battery in Experimental Example 2.

Coin-type lithium secondary battery cells of Examples 12 to 14 were fabricated with the same method as in Experimental Example 1 using the positive electrode, negative electrode, and an electrolyte. Cycle characteristics of the obtained lithium secondary battery cells were estimated with the same method as in Experimental Example 1. The results are shown in FIG. 9. The electrolyte of the lithium secondary battery cell of Example 12 includes 5 wt % of silicone oil. The electrolyte of the lithium secondary battery cell of Example 13 includes 10 wt % of silicone oil. The electrolyte of the lithium secondary battery cell of Example 14 includes 20 wt % of silicone oil. In FIG. 9, the result of the lithium secondary battery cell of Example 1 where the electrolyte includes only $LiPF_6$ is illustrated for comparison.

As shown in FIG. 9, Examples 12 and 13 where silicone oil was added within a range of 5 to 10 wt % relatively showed improved cycle characteristics. The cycle characteristics of Example 14, including 20 wt % of silicone oil, after 10 cycles are remarkably reduced indicating that it is deteriorated. This results from an excessive amount of silicone oil which induces an increase of electrolyte viscosity and reduces ion conductivity.

Experimental Example 3

A positive electrode and a negative electrode were fabricated using the same method as in Experimental Example 1.

Electrolytes of Examples 15 to 17 were prepared by adding 1.3M $LiPF_6$ as a solute to a solvent of ethylenecarbonate (EC) and diethylcarbonate (DEC) mixed in a ratio of EC:DEC=30:70, and adding 1 wt % of silicone oil.

The silicone oil of Example 15 was k=0, m=3, n=3, R and Z=$CH_3$ in the structure of above formula 2. The silicone oil of Example 16 was k=0, m=3, n=6, R and Z=$CH_3$ in the structure of above formula 3. The silicone oil of Example 17 was a silicone oil where k=0, m=3, n=4, and R and Z=$CH_3$ in the above formula 3.

Figure 10:
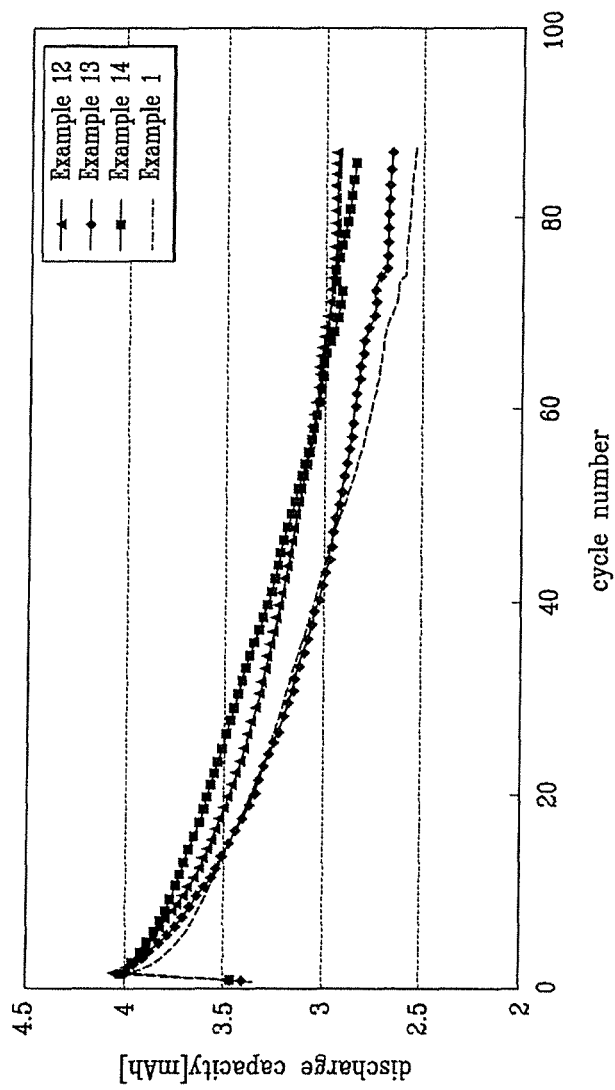
FIG. 10 is a graph showing a relation between a cycle number and discharge capacity of a lithium secondary battery in Experimental Example 3.

Coin-type lithium secondary battery cells of Examples 15 to 17 were fabricated using the same method as in Experimental Example 1 using the positive electrode, negative electrode, and an electrolyte. Cycle characteristics of the obtained lithium secondary battery cells were estimated with the same method as in Experimental Example 1. The results are shown in FIG. 10. In FIG. 10, the result of the lithium secondary battery cell of Example 1 where the electrolyte includes only $LiPF_6$ is illustrated for comparison.

As shown in FIG. 10, Examples 15 to 17 including silicone oil showed good cycle characteristics compared to Example 1

Experimental Example 4

A positive electrode was fabricated using the same method as in Experimental Example 1.

A negative active material being composed of a multi-phase alloy powder was prepared by the following processes. First, 65 parts by weight of Si that has a massive phase near to a regular hexahedron having one edge length of 5 mm, 25 parts by weight of Ni powder, and 10 parts by weight of Ag powder were each prepared, and were mixed. Then, an alloy melt solution was fabricated by dissolving them with high frequency heating under argon atmosphere. A quenched alloy powder having a 10 μm average particle diameter was prepared by quenching the alloy melt solution through gas atomization using helium gas having 80 kg/cm² pressure. The quenching rate was 1×10⁵ K/second.

The obtained quenched alloy powder was put into a 5N sodium hydroxide aqueous solution and was impregnated for 1 hour through agitating at room temperature. Then, it was washed sufficiently so that sodium residue did not remain, and was dried. It was performed to take a particle size control to have 10 μl average particle diameter. As described above, a negative active material was fabricated.

A negative electrode slurry was prepared by mixing the obtained negative active material and a binder of polyvinylidene fluoride, and then by mixing with N-methyl-2-pyrrolidone. The negative electrode slurry was coated onto a current collector 14 μm thick Cu foil by doctor blade method, dried at 120° C. for 24 hours under vacuum atmosphere to volatilize N-methyl-2-pyrrolidone, and then pressed. An active mass including negative active material was laminated with the current collector to fabricate a negative electrode.

Electrolytes of Examples 18 to 21 were prepared by adding solute and silicone oil as described in the following Table 2 into a solvent of ethylenecarbonate (EC) and diethylcarbonate (DEC) mixed in a ratio of EC:DEC=30:70. Silicone oils 1 and 2 of the following Table 2 are the same as in Table 1.

The positive electrode was cut in a disk shape of 14 mm diameter, and the negative electrode was cut in a disk shape of 16 mm diameter. Also, a polypropylene porous separator was arranged between the fabricated positive electrode and negative electrode, and housed in a battery case. The electrolyte was injected, and the battery case closed and sealed to fabricate a coin-type lithium secondary battery cell having 20 mm diameter and 1.6 mm thickness.

The obtained lithium secondary battery cells were initially charged and discharged as follows: they were aged for 15 hours, were charged at 0.2 C to 4.2V under constant current, then were constant voltage charged under constant current and constant voltage at 4.2V for 9 hours, and then discharged under constant current at 0.2 C to 2.75V.

After initial charge and discharge, 1 cycle charge and discharge were performed as follows: the lithium secondary battery cells were charged under constant current at 1 C (0.8 mA) to 4.2 V and constant voltage charged under constant current and constant voltage at 4.2V for 2.5 hours and discharged under constant current 1 C (0.8 mA) to 2.75V. The above charge and discharge cycle was performed to 120 cycles and capacity retentions of the lithium secondary battery cells after 120 cycles were measured. The results are shown in the following Table 2 and FIGS. 11 and 12.

TABLE 2

|  | Solute | Silicone oil | Capacity retention (%) |
|---|---|---|---|
| Example 18 | 1.3M $LiPF_6$ | — | 68.2 |
| Example 19 | 1.3M LiTFSI + $LiPF_6$ (80:20) | Silicone oil (1 wt %) | 77.7 |
| Example 20 | 1.3M LiTFSI + $LiPF_6$ (80:20) | — | 68.4 |
| Example 21 | 1.3M LiTFSI + $LiPF_6$ (80:20) | Silicone oil (1 wt %) | 81.1 |

As a result of X-ray diffraction of the negative active material, it was confirmed that there were a mixed phase of a Si crystalline phase, $NiSi_2$ crystalline phase, and Ag crystalline phase.

It was confirmed by examination using an electron microscope that the negative active material had a plurality of fine pores on its surface. These fine pores are expected to be formed from elution Si-phase which is exposed on the surface. As a result of elemental analysis of the particle surface by X-ray, $NiSi_2$ phase was present at its surface and Si-phase was not detected. This results because Si-phase on the surface was removed through the impregnation treatment of an alkali solution. Therefore, Si-phase detected using X-ray diffraction was present inside of the particle.

Figure 11:
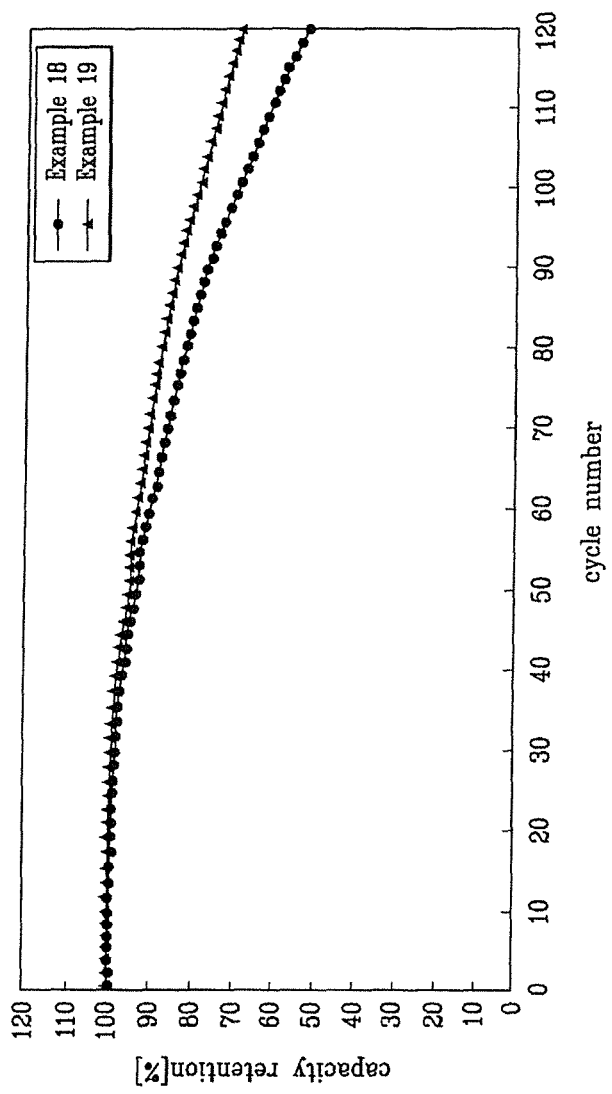
FIG. 11 is a graph showing a relation between a cycle number and capacity retention of lithium secondary batteries of Examples 18 and 19.
Figure 12:
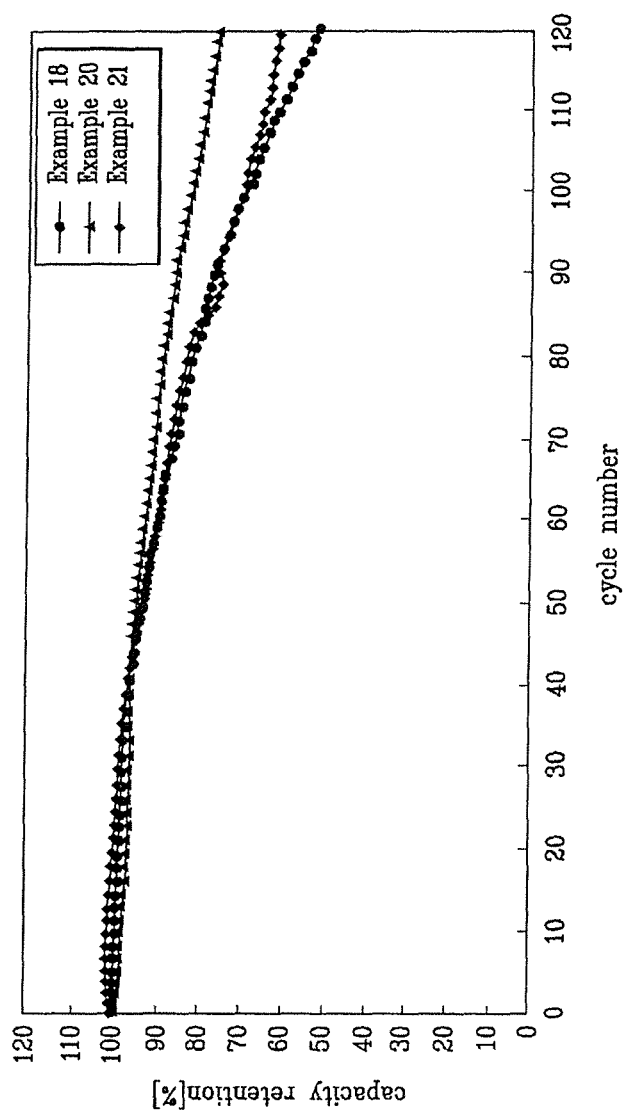
FIG. 12 is a graph showing a relation between a cycle number and capacity retention of lithium secondary batteries of Examples 18, 20, and 21.

As shown in Table 2 and FIGS. 11 and 12, both Examples 19 and 21, respectively including silicone oils 1 and 2, each show good cycle characteristics compared to Example 18 (Comparative Example) including only $LiPF_6$. Example 20 where $LiPF_6$ and $Li(N(SO_2CF_3)_2)$ were added, even though silicone oil was not added, shows more improved cycle characterstics than Example 18.

As described above, when a multi-phase alloy powder is used as a negative active material, cycle characteristics can also be improved significantly by adding $Li(N(SO_2CF_3)_2)$ as well as $LiPF_6$ to the electrolyte, or adding a silicone oil to the electrolyte.

The lithium secondary battery of the present invention has high capacity as well as improved cycle characteristics.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A lithium secondary battery comprising:
   a positive electrode comprising a positive active material;
   a negative electrode comprising a negative active material; and
   an electrolyte, and
   the electrolyte comprises a solvent, a polyether modified silicone oil where a linear polyether chain is linked to a polysiloxane chain, and a solute comprising a lithium salt, the negative active material comprises a multi-phase alloy powder comprising a multi-phase alloy powder particle which comprises Si-phase and SiM-phase, and also comprises either one or both of X-phase or SiX-phase, and an amount of Si-phase on a surface of the multi-phase alloy powder particle is less than that inside of the particle, wherein M is at least one element selected from the group consisting of Ni, Co, As, B, Cr, Cu, Fe, Mg, Mn, and Y, X is at least one element selected from the group consisting of Ag, Cu, and Au, M and X are not both Cu, and each Si-phase, SiM-phase, X-phase and SiX-phase is present in a uniformly mixed state except on the surface of the multi-phase alloy powder particle.

2. The lithium secondary battery of claim 1, wherein the multi-phase alloy powder particle has pores having an average pore diameter of about 10 nm to about 5 μm.

3. The lithium secondary battery of claim 1, wherein the multi-phase alloy powder particle has a specific surface area of $0.2 \text{ m}^2/\text{g}$ to $5 \text{ m}^2/\text{g}$.

4. The lithium secondary battery of claim 1, wherein the negative active material includes X at 1 to 30 wt % based on the total weight of the negative active material.

5. The lithium secondary battery of claim 1, wherein X is at least one element selected from the group consisting of Ag and Au.

* * * * *